(12) United States Patent
Ng et al.

(10) Patent No.: US 7,279,674 B2
(45) Date of Patent: Oct. 9, 2007

(54) OPTICAL ENCODER MODULE

(75) Inventors: Kee-Yean Ng, Penang (MY); Kok-Hing Fo, Penang (MY); Yee-Loong Chin, Perak (MY); Chee-Keong Chong, Penang (MY); Chin-Yun Lee, Penang (MY)

(73) Assignee: Avago Technologies ECBU IP (Singapore) Pte Ltd

( * ) Notice: Subject to any disclaimer, the term of this patent is extended or adjusted under 35 U.S.C. 154(b) by 597 days.

(21) Appl. No.: 10/344,836

(22) PCT Filed: Aug. 15, 2001

(86) PCT No.: PCT/US01/25599

§ 371 (c)(1), (2), (4) Date: Jun. 13, 2003

(87) PCT Pub. No.: WO02/14794

PCT Pub. Date: Feb. 21, 2002

(65) Prior Publication Data

US 2005/0068773 A1   Mar. 31, 2005

(30) Foreign Application Priority Data

Aug. 17, 2000   (MY) .............................. PI 20003785

(51) Int. Cl.
*G01D 5/34* (2006.01)
(52) U.S. Cl. ................... 250/231.13; 250/239
(58) Field of Classification Search ........... 250/231.13, 250/239, 231.14, 231.17, 231.18; 257/81, 257/100, 433

See application file for complete search history.

(56) References Cited

U.S. PATENT DOCUMENTS

| 3,903,218 | A |   | 9/1975 | Humphrey |
|---|---|---|---|---|
| 4,190,767 | A | * | 2/1980 | Crouse ................... 250/231.13 |
| 4,691,101 | A |   | 9/1987 | Leonard |
| 4,915,484 | A |   | 4/1990 | Yamamoto |
| D329,193 | S |   | 9/1992 | Togami et al. |
| 5,241,172 | A | * | 8/1993 | Lugaresi ................ 250/231.16 |
| 5,289,082 | A |   | 2/1994 | Komoto |
| 5,291,038 | A | * | 3/1994 | Hanamoto et al. ............ 257/82 |

(Continued)

FOREIGN PATENT DOCUMENTS

JP           61254915 A       11/1986

(Continued)

OTHER PUBLICATIONS

Japan Office Action dated Mar. 14, 2006 involving Japan Application No. 2004-041597 (co-pending application).

(Continued)

*Primary Examiner*—Thanh X. Luu
*Assistant Examiner*—Stephen Yam (57) ABSTRACT

An optical encoder module is employed to detect light modulated by a moveable member (e.g., code wheel). The optical encoder includes an emitter having a light-emitting element, and a transparent medium encapsulating the light-emitting element. The transparent medium has a convex aspherical external surface shaped so as to focus light received from the light-emitting element into a substantially collimated beam of light using a single refractive interface for illuminating the movable member. The optical encode module also includes a detector facing the emitter for detecting modulated light of the collimated beam transmitted through the movable member.

9 Claims, 8 Drawing Sheets

U.S. PATENT DOCUMENTS

| | | | |
|---|---|---|---|
| 5,317,149 A * | 5/1994 | Uebbing et al. | 250/231.14 |
| 5,495,358 A | 2/1996 | Bartig et al. | |
| 5,589,930 A | 12/1996 | Kurahashi et al. | |
| 5,841,177 A | 11/1998 | Komoto et al. | |
| 5,898,267 A | 4/1999 | McDermott | |
| 5,986,788 A | 11/1999 | Sasaki et al. | |
| 6,335,548 B1 | 1/2002 | Roberts et al. | |
| 6,410,911 B1 * | 6/2002 | Omi | 250/231.13 |
| 6,617,615 B1 * | 9/2003 | Ueda | 257/98 |
| 6,627,869 B2 | 9/2003 | Tanaka et al. | |
| 6,876,471 B1 | 4/2005 | Konno | |
| 6,979,104 B2 | 12/2005 | Brass et al. | |
| 2003/0156842 A1 | 8/2003 | Morimoto et al. | |
| 2004/0165277 A1 | 8/2004 | Ng et al. | |

FOREIGN PATENT DOCUMENTS

| | | | |
|---|---|---|---|
| JP | 01109317 A | 4/1989 | |
| JP | 05029660 A | 2/1993 | |
| JP | 06-012677 A | 1/1994 | |
| JP | 06-224859 A | 8/1994 | |
| JP | 09258099 A | 10/1997 | |
| JP | 10178393 A | 6/1998 | |
| JP | 2000294832 A | 10/2000 | |
| JP | 2000294838 A | 10/2000 | |

OTHER PUBLICATIONS

English translation of Japan Office Action dated Mar. 14, 2006 involving Japan Application No. 2004-041597 (co-pending application).

* cited by examiner

FIG. 1

Prior Art

OPTICAL ENCODER MODULE

FIELD OF THE INVENTION

The present invention pertains to optical encoders. More particularly, the present invention relates to an optical encoder module that includes a light-emitting device with a collimating lens.

BACKGROUND

An optical encoder module typically includes a light emitting device or emitter, and a photo-detector device or detector. The emitter and the detector are spaced apart from each other and aligned to each other such that a code wheel attached to a shaft can be rotated in a gap between the emitter and the detector. The code wheel has alternating opaque and transparent areas such that light emitted by the emitter is either blocked or passed by the code wheel and then detected by the detector. An optical encoder module of this type is described in more detail in U.S. Pat. No. 4,691,101. The design of such an encoder module is also illustrated in U.S. Design Pat. No. Des. 329,193.

Figure 1:
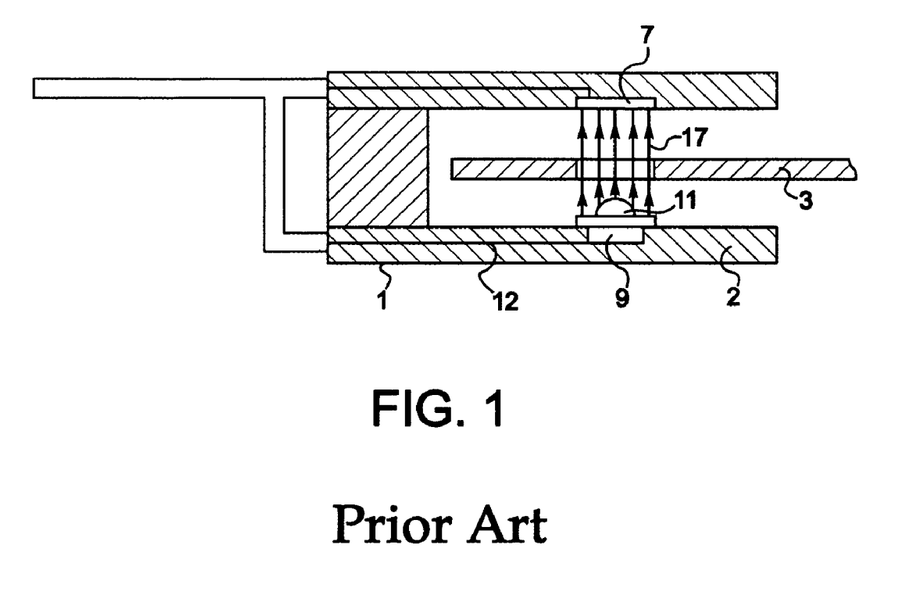
FIG. 1 is a cross-sectioned view of a known optical encoder module.

FIG. 1 illustrates a known optical encoder module 1 having a housing 2, and an emitter (i.e., 9, 11) and a detector 7 that face each other in an aligned relationship. The emitter (i.e., 9, and 11) and the detector 7 are spaced apart to allow a code wheel 3 to be rotated in the gap formed therebetween. The emitter (9, 11) consists of a light emitting diode (LED) 9 and a separate lens positioned over the LED 9 to receive light from the LED 9 and to produce a beam of light 17 in the direction of the detector 7. The LED 9 consists of a semiconductor die of, for example, the GaP or GaAsP type, mounted and electrically coupled via direct or wire bonding to a metal lead-frame 12. Additionally, the LED 9 may be encapsulated with a transparent epoxy material. The separate collimating lens 11 is molded from a plastics material and is mounted onto the housing 2 in correct alignment with the LED 9.

The detector 7 includes four elongated photo-detecting elements that are arranged side-by-side at different angular positions relative to the code wheel 3 so as to receive light from different portions of the light beam 17. In this way, the encoder module is able to detect both speed and direction of rotation of the code wheel 3.

As is known, the generation of a collimated beam of light from the emitter (i.e., 9, 11) to the detector 7 is an important feature that ensures accurate operation of the encoder. Light straying from the collimated beam is undesirable and contributes to parallax errors in the encoder and degradation of the operational dynamic range of the photo-detecting elements.

However, the foregoing design of encoder module suffers from various limitations in generating a collimated beam of light from the emitter (i.e., 9, 11) to the detector 7. First, the collimating lens 11 receives light from the LED 9 through a bottom planar surface and focuses light as it exits from the curved top surface. Both the top and bottom surfaces are refracting surfaces that contribute to the collimation of light from LED 9. Consequently, the ability of the collimating lens to accurately collimate light is limited not just by manufacturing tolerances and inaccuracies in producing the top surface and the bottom surface, but also by the relative positions and orientations of the top and bottom surfaces.

The position of the collimating lens 11 relative to the LED 9 is also critical to the performance of the emitter (i.e., 9, 11) in generating a collimated beam of light. Accurate placement of the lens over the LED 9 is a time consuming process that adds additional cost to the assembly of the encoder module. In addition, inclusion of a collimating lens mounted on the encoder housing limits the ability of manufacturers to design smaller encoders.

SUMMARY OF THE INVENTION

One feature of the present invention is to provide an optical encoder module that can cause a collimated light beam to be generated from its emitter to its detector.

Another feature of the present invention is to provide an optical encoder module that can cause a collimated light beam to be generated from its emitter to its detector and yet has a minimized size and is relatively easy and cost effective to manufacture.

According to one embodiment of the present invention, an optical encoder module is employed to detect light modulated by a moveable member (e.g., code wheel). The optical encoder includes an emitter having a light-emitting element, and a transparent medium encapsulating the light-emitting element. The transparent medium has a convex aspherical external surface shaped so as to focus light received from the light-emitting element into a substantially collimated beam of light using a single refractive interface for illuminating the movable member. The optical encode module also includes a detector facing the emitter for detecting modulated light of the collimated beam transmitted through the movable member.

DETAILED DESCRIPTION

Figure 2:
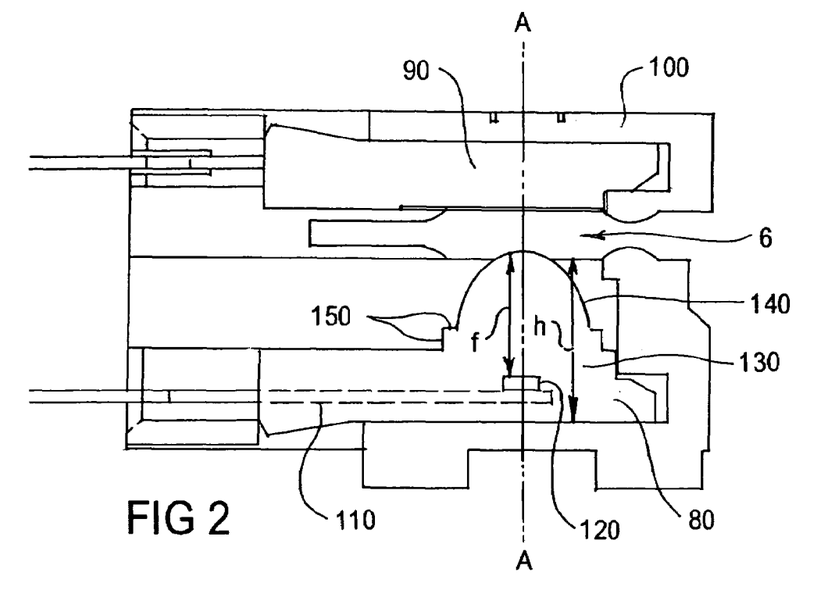
FIG. 2 is a schematic cross-sectional view of an optical encoder module according to one embodiment of the present invention.
Figure 3:
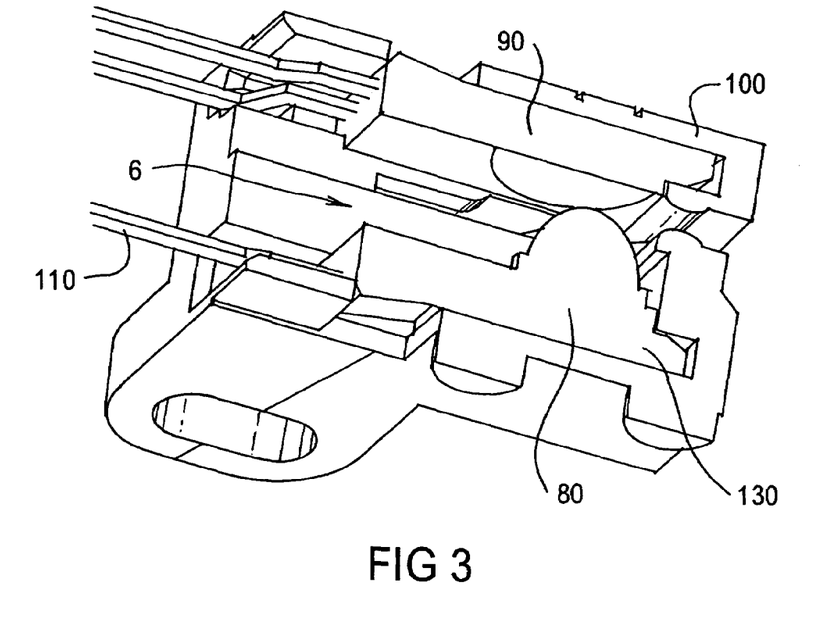
FIG. 3 is a perspective cross-sectional view of the optical encoder module of FIG. 2.

FIGS. 2 and 3 show an optical encoder module according to one embodiment of the present invention. The optical encoder module includes an emitter 80, a detector 90, and a code wheel (not shown) positioned in a gap 6 between the emitter 80 and the detector 90.

As will be described in more detail below, the optical encoder module in accordance with one embodiment of the present invention is employed to detect light modulated by the code wheel. The emitter 80 includes a light-emitting element or device (e.g., the diode 120), and a transparent medium (e.g., the encapsulant 130) encapsulating the light-emitting element 120. The transparent medium 130 has a convex aspherical external surface (i.e., the surface 140) shaped so as to focus light received from the light-emitting element 120 into a substantially collimated beam of light for illuminating the detector 90 via the code wheel.

Advantageously, the optical encoder module provides a compact source for generating a collimated beam of light. A further benefit is that the optical encoder module in accordance with one embodiment of the present invention allows light to be collimated using a single refractive interface. Thus each ray of light from the light-emitting element 120 is only refracted once before it enters the collimated beam. The single optical interface results in a simpler optical path that in turn results in a greater intensity of light being transmitted to the collimated beam. In one embodiment, the convex aspherical external surface 140 is defined by an expression as follows.

$$Z = \frac{\frac{R^2}{r}}{1 + \sqrt{1 - (1+c)\left(\frac{R}{r}\right)^2}} + \sum_{n=2}^{m} k_n R^{2n}$$

wherein R is the distance between a point on the aspherical surface 140 and the optical axis, Z is the distance between a projection of the point onto the optical axis and the point of intersection between the optical axis and the aspherical surface 140, m is chosen from the group of whole numbers greater than two, and r is defined by the expression rf*(n1)/n wherein n is the refractive index of the transparent medium 130, and f is the distance between the light emitting element and the point of intersection between the optical axis and the aspherical surface.

In one embodiment, the transparent encapsulating medium 130 is an epoxy compound. Furthermore, the convex aspherical external surface 140 may be produced by molding the transparent encapsulating medium 130, such as the epoxy compound. Thus, the optical encoder module can be accurately manufactured using mass production techniques. This makes an optical encoder module according to the invention simpler and cheaper to produce. In one embodiment, the light-emitting element 120 is electrically coupled to a lead-frame 110, the lead-frame 110 being partially encapsulated by the transparent medium 130. In addition, the optical encoder module in accordance with one embodiment of the present invention does not require the accurate placement of any collimating lens during assembly of the encoder. The optical encoder module in accordance with one embodiment of the present invention will be described in more detail below, also in conjunction with FIGS. 2–8.

As shown in FIGS. 2 and 3, the optical encoder module includes a housing 100 which is integrally made of a plastic material and comprises two recesses arranged one above the other. Each recess has an open end, and closed end opposite to the open end. The gap 6 is formed in the housing 100 between the recesses such that it is open to one end of the housing 100. The gap opening is adjacent to the closed end of the recesses.

The encapsulated optical emitter 80 is accommodated within one recess, and the encapsulated optical detector 90 is accommodated within the other recess. The encapsulation of the emitter 80 and that of the detector 90 have each a locking projection 10 for engaging with respective locking openings 5 to lock the emitter 80 and the detector 90 into a locking position in the respective recesses. The encapsulation of the emitter 80 and the detector 90 is made of an epoxy material that is transparent to light. This is due to the configuration of the transimpedance amplifier 410 as well as the use of the dummy transimpedance amplifier 420 and the unity gain buffer 440, which will be described in more detail below, also in conjunction with FIGS. 3–5.

The emitter 80 and the detector 90 are spaced and aligned to each other such that a code wheel may be rotated through the gap 6 between the emitter 80 and the detector 90 and may be detected and read by the optical encoder module. This alignment is indicated in FIG. 2 by the axis A—A. The light emitted by the emitter 80 is passed through or blocked by the code wheel and then detected by the detector 90. Since the emitter 80 and the detector 90 are exactly aligned to each other, i.e. the emitter 80 and the detector 90 are arranged to face each other in an accurate overlapping position, a reliable operation of the optical encoder module is ensured.

The emitter 80 includes the metal lead-frame 110, the light emitting diode chip 120, and the molded epoxy encapsulant 130. The LED chip 120 is mounted and electrically coupled to two leads of the metal lead frame by any suitable technique known to those in the art, for example by wire bonding. The two leads provide electrical power to the LED chip 120 such that it may act as a light-emitting element for the emitter 80.

The molded epoxy resin compound 130 encapsulates the entire LED chip 120 and portions of the lead-frame 110 coupled to the LED chip 120. The encapsulant is molded so as to provide an aspherical lens 135 above the LED chip 120. The aspherical lens 135 has an optical axis along the axis A—A, and is shaped such that light emitted by the LED chip 120 is refracted into a collimated beam. The aspherical lens is defined by a single lens surface 140. Surfaces 150 adjacent to the lens 135 are roughened to prevent internal reflection and to reduce stray light rays in the collimated light beam.

The profile of the convex aspherical external surface 140 is defined by the expression:

$$Z = \frac{\frac{R^2}{r}}{1 + \sqrt{1 - (1+c)\left(\frac{R}{r}\right)^2}} + \sum_{n=2}^{m} k_n R^{2n}$$

wherein R is the distance between a point on the aspherical surface 140 and the optical axis, Z is the distance between a projection of the point onto the optical axis and the point of intersection between the optical axis and the aspherical surface 140, m is chosen from the group of whole numbers greater than two, and r is defined by the expression rf*(n1)/n wherein n is the refractive index of the transparent medium 130, and f is the distance between the light emitting element and the point of intersection between the optical axis and the aspherical surface.

The value of n will be approximately 1.5 for an epoxy encapsulant. The distance between the top of the lens surface and the LED chip 120 may, for example, be 3 mm, and the largest radius R of the lens may, for example, be 1.3 mm. The width of the collimated beam at the detector is known as the target illumination spot size.

The specific shape of the lens surface is dependent on the value of the constants c and $k_n$. Because of the complexity of the equation, mathematical or computational approaches for deriving the constants c and $k_n$ are unsuitable. Instead, the constants are determined empirically using a systematic method illustrated in FIGS. 4A and 4B.

Using a optics simulation program, such as the Advanced Systems Analysis Program (ASAP) available from Breault Research Organisation, Inc. of Tucson, Ariz., it is possible to determine the constants up to the twentieth order of R, i.e. where n=10.

Figure 4A:
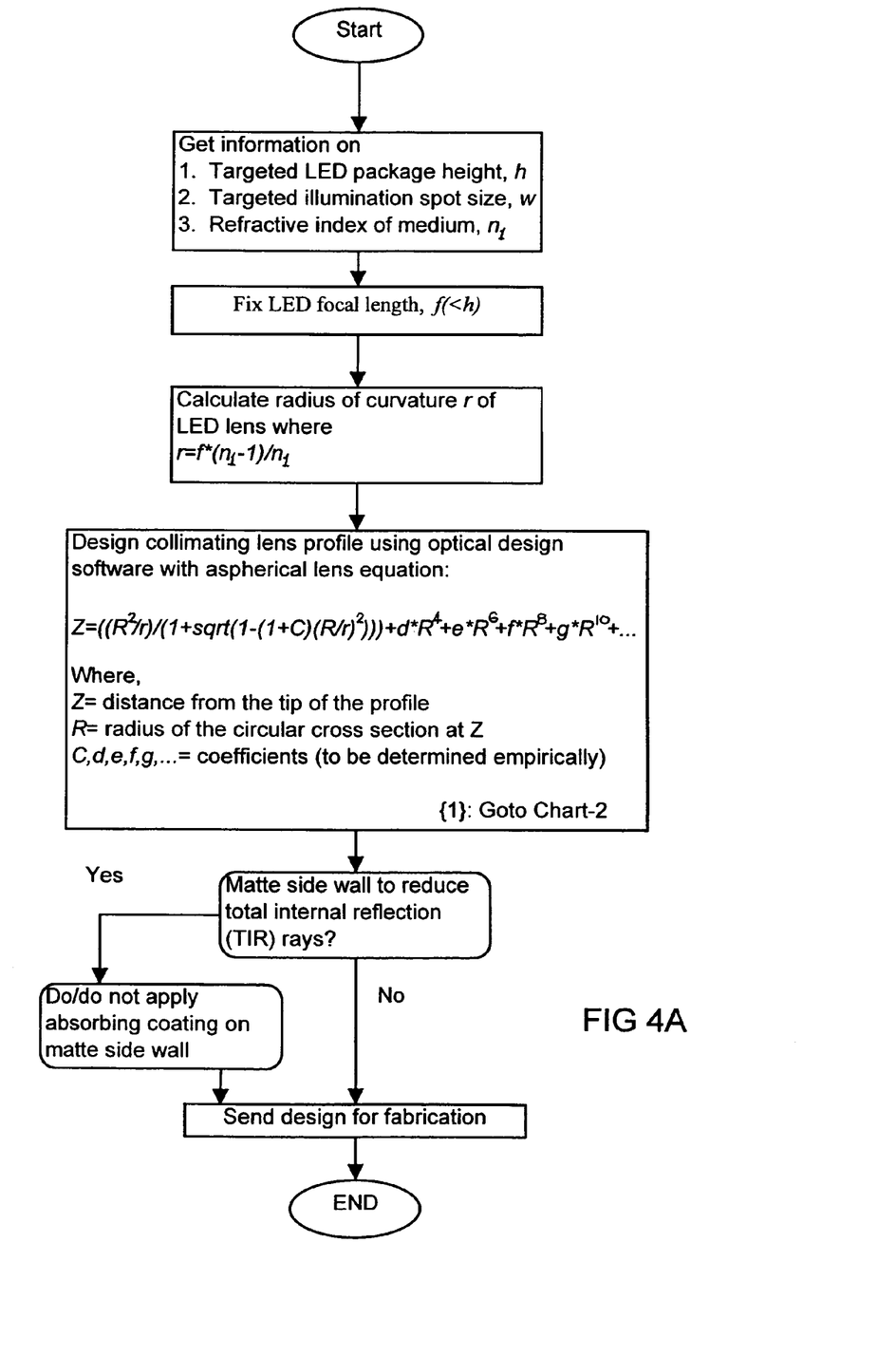
FIGS. 4A and 4B are flowcharts showing possible steps for designing a light emitting device in accordance with the invention.

Referring to FIG. 4A, the flowchart shows a series of steps 400 to 460 suitable for designing a profile for the aspheric lens surface 140 in accordance with the invention. In the first step 400, information concerning the target characteristics of the optical encoder module needs to be gathered. Specifically, the target height h for the encapsulated optical emitter 80, the illumination spot size w on the encapsulated optical detector 90, and the refractive index n1 of the molded epoxy encapsulant 130 need to be determined.

In step 410, the target distance between the light emitting element 120 and the point of intersection between the optical axis A—A and the aspherical lens surface 140 is set to a value lower than the height h of the emitter 80.

From the values of the distance f and the refractive index $n_1$, a radius of curvature value r is calculated for the lens in step 420.

Figure 4B:
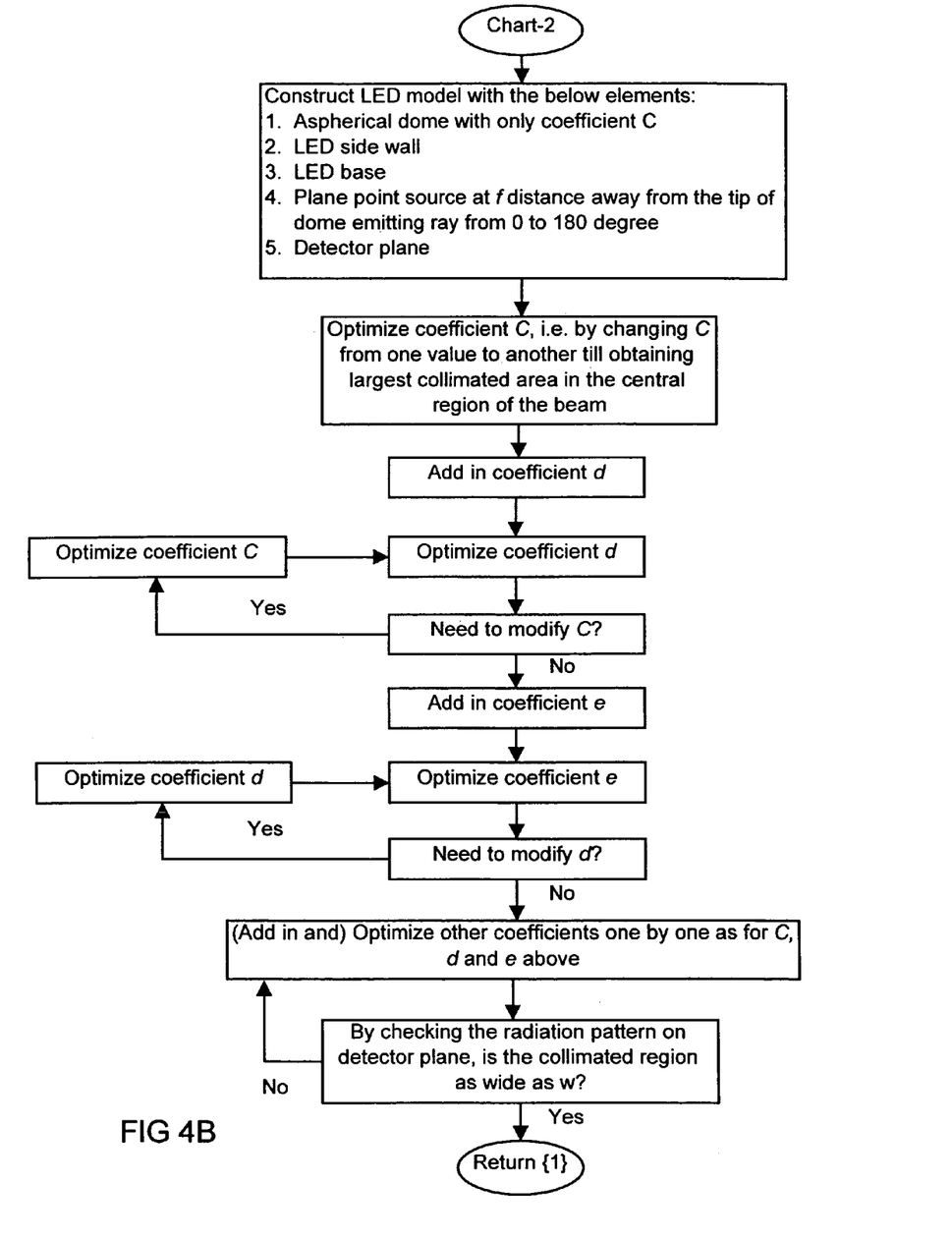

In step 430, the profile of the lens is calculated according the prescribed formula using the circular coordinates Z and R. The coefficients given in the formula are determined empirically with the aid of an optics simulation program. FIG. 4B illustrates the steps for performing the empirical measurements.

Steps 440 and 450 provide a choice to the designer whether to make the side walls 150 matte to reduce internal reflection rays, and if so whether the matted walls 150 include an absorbing coating. Finally, step 460 illustrates the step of sending the design for fabrication.

Figure 5:
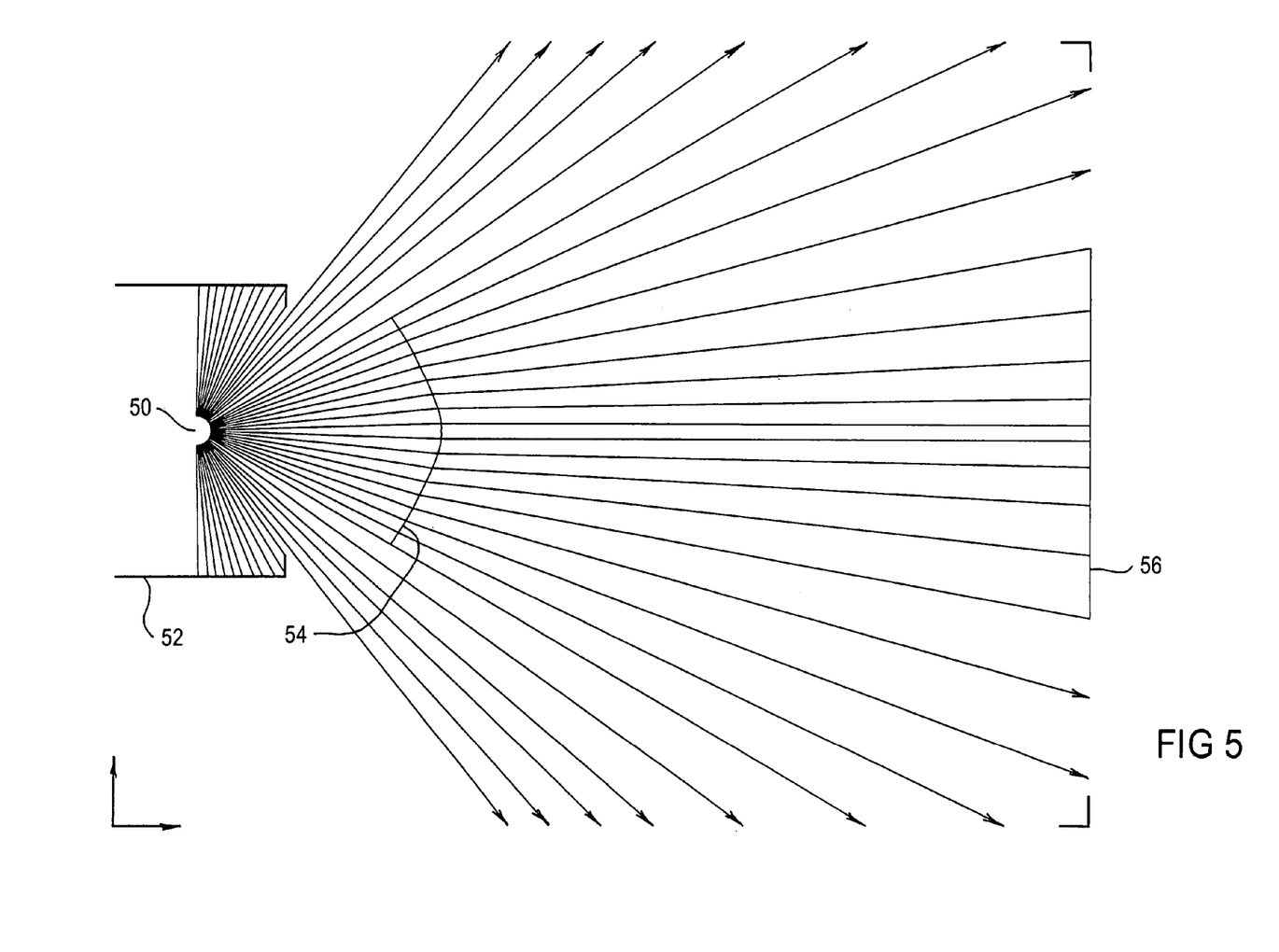
FIGS. 5 to 8 are computer simulation plots showing the refraction of light rays at different stages in the design of a light-emitting device in accordance with one embodiment of the invention.

Referring to FIG. 4B, the first step 470 in the empirical measurement process illustrates how the simulation program is programmed to define five elements. Referring also to FIG. 5, the first element is the aspheric lens surface 54 which is determined according to the prescribed formula of step 430 with coefficients d, e, f, g . . . set to zero, and coefficient C set to a non-zero value. The second element is the LED sidewall or emitter body 52 defining an aperture. The third element is the LED base that provides a base for the fourth element, the isotropic point light source 50 located at a distance f from the apex of the lens surface. The fifth element is the detector plane 56 positioned at a distance corresponding to the detector 90.

As shown in FIG. 5, rays of light are simulated by the optics simulation program being emitted from the point light source 50 in a single plane between 0 degrees and 180 degrees at fixed angular intervals. The program simulates refraction of the light rays by the aspheric lens surface element 54 towards the detector 56.

In step 480, the coefficient C is first optimised by adjusting its value until the rays of light are collimated as close to the optical axis as possible. At this stage the other coefficients or constants are set to zero.

In the subsequent steps 491 to 499, each constant is then optimised in turn, i.e. with increasing n, until the beam of light is optimised as a substantially collimated beam of light. If one constant has been adjusted significantly, the previous constant may need to be re-optimised as shown in steps 493 and 497.

In the final step 500, the distribution of the light rays on the detector plane is analysed to assess whether a majority are evenly distributed across the specified spot size w. If so, the coefficients are successfully optimised.

Figure 6:
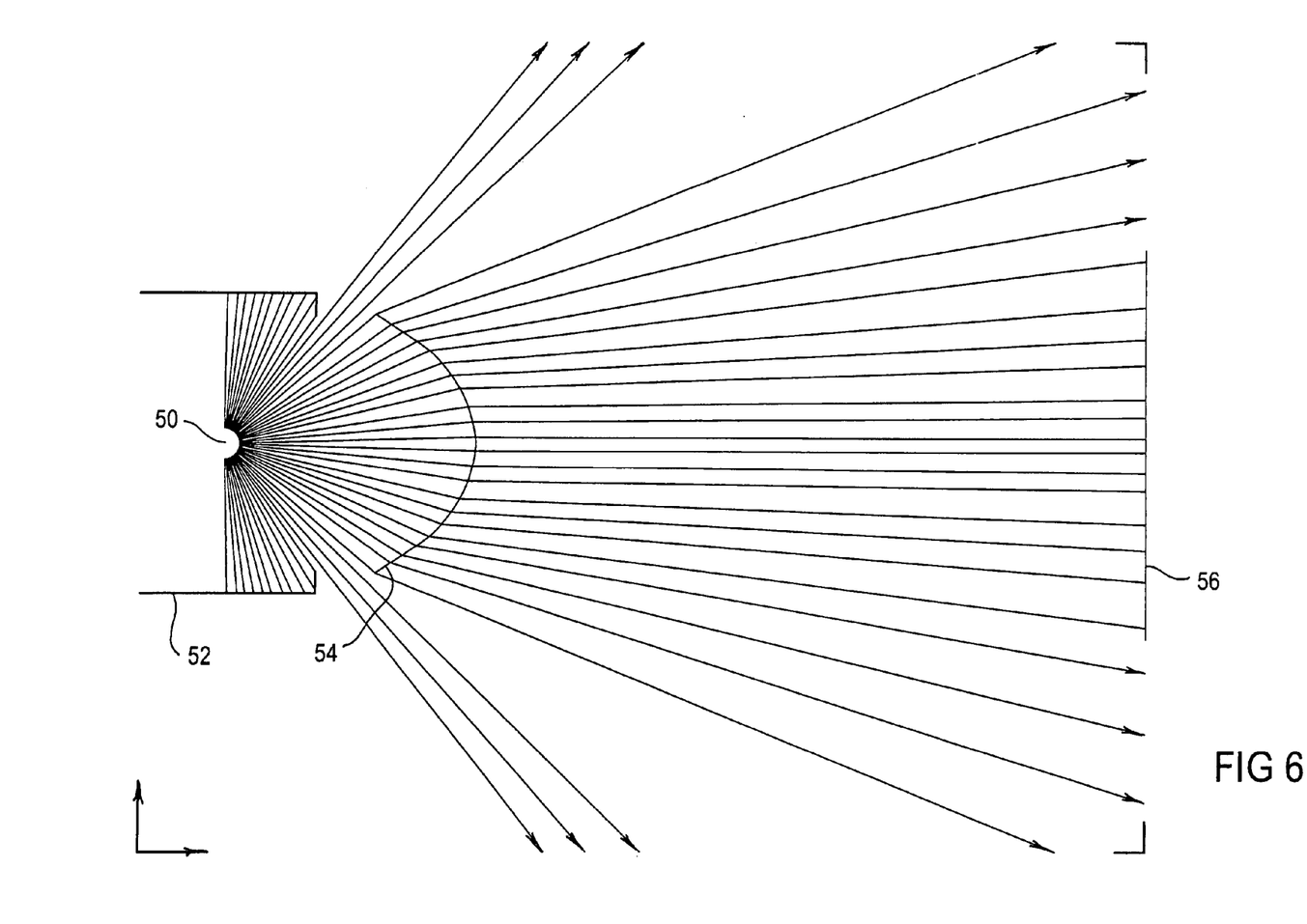
Figure 7:
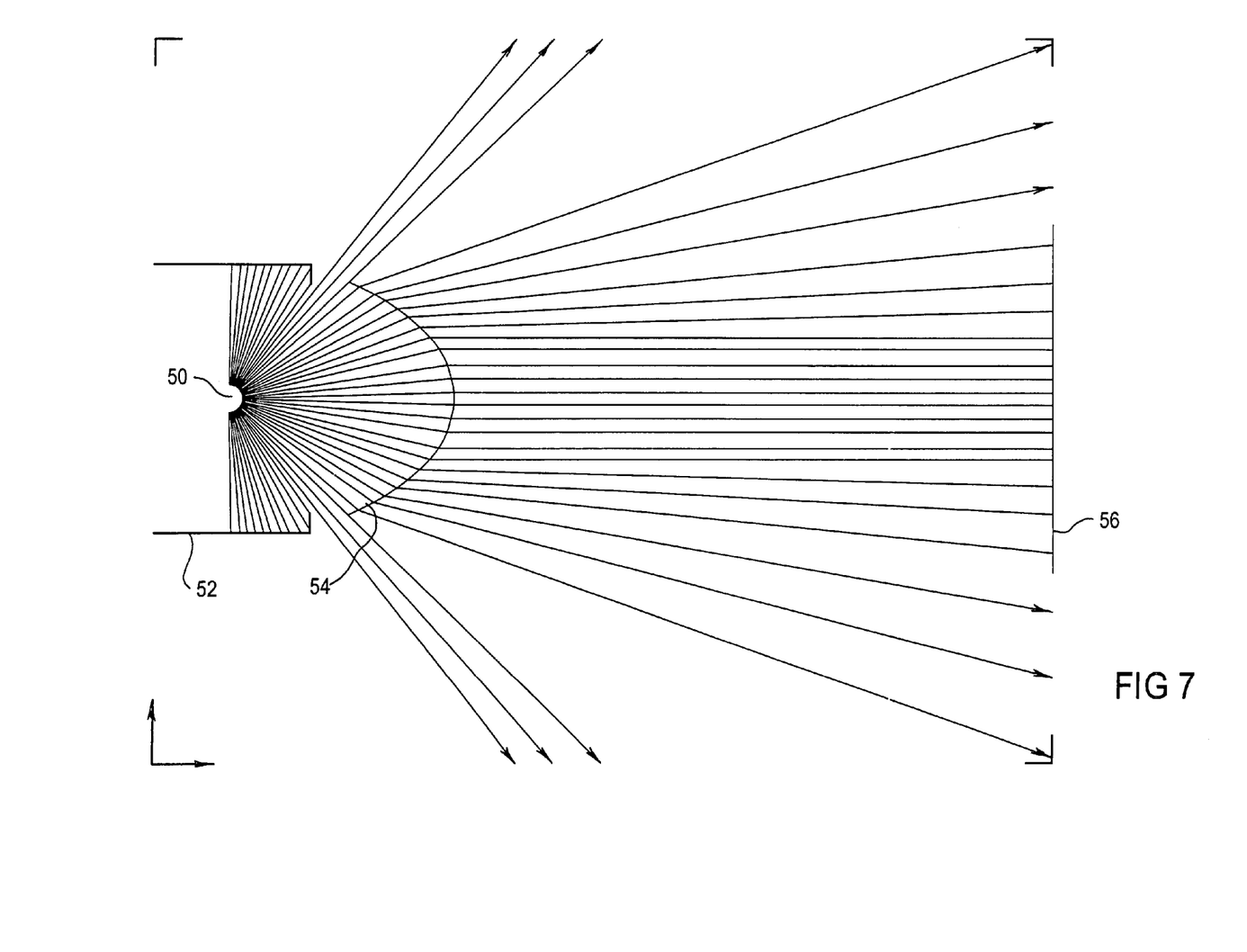
Figure 8:
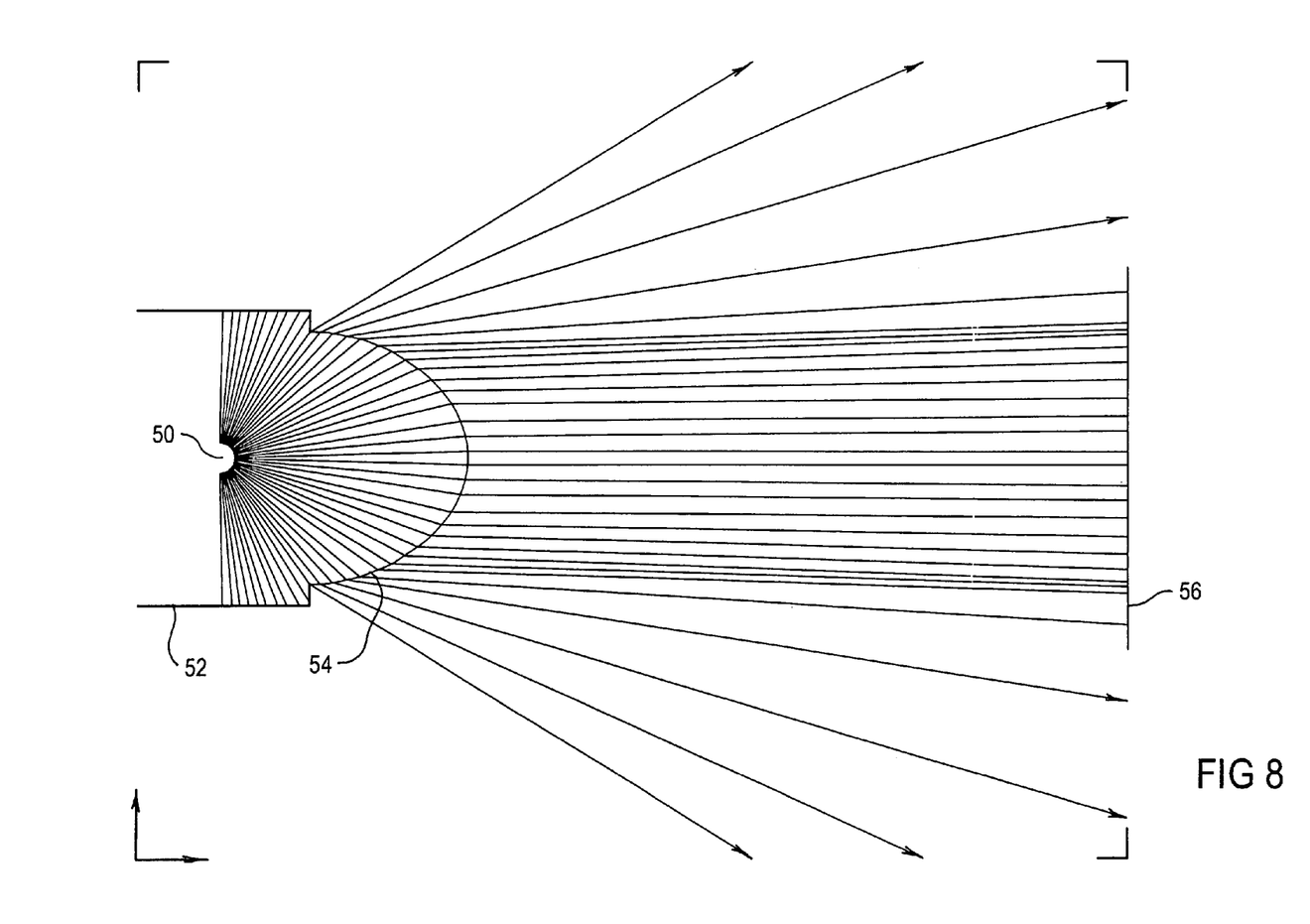

FIG. 5 shows the simulated light rays for an unoptimised value of c, FIG. 6 shows the light rays for an optimised value of c, FIG. 7 shows the light rays for an optimised value of d, and FIG. 8 shows the light rays for all constants up to n=10 optimised.

Various alterations and modifications can be made to the arrangements and techniques described herein, as would be apparent to one skilled in the relevant art.

The invention claimed is:

1. A compact optical encoder module, comprising a housing having upper and lower recesses, a light emitting element located in the lower recess, a first transparent material encapsulating the light emitting element and forming a single optical interface convex aspherical lens thereover, a light detector located in the upper recess and positionally aligned with the lens, a second transparent material encapsulating the light detector, and a moveable member disposed in a gap between the light emitting element and the light detector and configured to modulate a light beam passing therebetween, the light emitting element, the lens and the first transparent material being configured to focus light emitted by the light emitting element into a substantially collimated light beam directed towards the light detector.

2. The compact optical encoder module according to claim 1, wherein the convex aspherical lens is radially symmetric about an optical axis.

3. The compact optical encoder module according to claim 1, wherein the light-emitting element is positioned substantially along the optical axis of the convex aspherical lens.

4. The compact optical encoder module according to claim 1, wherein the transparent encapsulating material is an epoxy compound.

5. The act optical encoder module according to claim 1, wherein the convex aspherical lens is produced by molding the transparent encapsulating material.

6. The compact optical encoder module according to claim 1, wherein the light-emitting element is a light emitting diode.

7. The compact optical encoder module according to claim 1, wherein the light emitting element is electrically coupled to a lead-frame, the lead-frame being at least partially encapsulated by the first transparent material.

8. The compact optical encoder module according to claim 1, wherein the movable member is a code wheel.

9. The compact optical encoder module according to claim 1, further comprising a locking projection configured to lock the light-emitting element and the detector into a locking position with respect to one another.

* * * * *

UNITED STATES PATENT AND TRADEMARK OFFICE
CERTIFICATE OF CORRECTION

| | |
|---|---|
| PATENT NO. | : 7,279,674 B2 |
| APPLICATION NO. | : 10/344836 |
| DATED | : October 9, 2007 |
| INVENTOR(S) | : Kee-Yean Ng |

It is certified that error appears in the above-identified patent and that said Letters Patent is hereby corrected as shown below:

Column 6, Line 43, Claim 5, delete "act" and insert -- compact --.

Signed and Sealed this
Twenty-sixth Day of February, 2013

Teresa Stanek Rea
*Acting Director of the United States Patent and Trademark Office*